US006955262B2

(12) United States Patent  
Seyffert et al.

(10) Patent No.: US 6,955,262 B2
(45) Date of Patent: Oct. 18, 2005

(54) REMOVABLE SEAL APPARATUS FOR VIBRATORY SEPARATOR

(75) Inventors: Kenneth W. Seyffert, Houston, TX (US); George Alexander Burnett, Aberdeen (GB); Guy L. McClung, III, Spring, TX (US)

(73) Assignee: Varco, I/P Inc., Houston, TX (US)

(*) Notice: Subject to any disclaimer, the term of this patent is extended or adjusted under 35 U.S.C. 154(b) by 240 days.

(21) Appl. No.: 10/429,264

(22) Filed: May 2, 2003

(65) Prior Publication Data

US 2004/0251174 A1 Dec. 16, 2004

(51) Int. Cl.$^7$ ................................................ B07B 1/46
(52) U.S. Cl. ...................... 209/405; 209/319; 209/372; 209/412
(58) Field of Search .................... 209/319, 370, 209/372, 405, 409, 410, 412

(56) References Cited

U.S. PATENT DOCUMENTS

| | | | |
|---|---|---|---|
| 3,022,893 A | | 2/1962 | Hasley |
| 3,035,700 A | * | 5/1962 | McCausland ............... 209/405 |
| 3,666,095 A | * | 5/1972 | Krynock et al. ............ 209/254 |
| 4,137,157 A | | 1/1979 | Deister et al. |
| 4,140,630 A | | 2/1979 | Scarlett et al. |
| 4,582,597 A | | 4/1986 | Huber |
| 4,735,712 A | | 4/1988 | Herren et al. |
| 4,871,454 A | | 10/1989 | Lott |
| 5,265,730 A | | 11/1993 | Norris et al. |
| 5,332,101 A | | 7/1994 | Bakula |
| 5,392,925 A | | 2/1995 | Seyffert |
| 5,417,858 A | | 5/1995 | Derrick et al. |
| 5,598,930 A | | 2/1997 | Leone et al. |
| 5,783,077 A | | 7/1998 | Bakula |
| 5,950,841 A | | 9/1999 | Knox et al. |
| 6,070,736 A | | 6/2000 | Ballman et al. |
| 6,152,307 A | | 11/2000 | Adams et al. |
| 6,269,954 B1 | | 8/2001 | Baltzer |
| 6,443,310 B1 | | 9/2002 | Schulte, Jr. et al. |

(Continued)

FOREIGN PATENT DOCUMENTS

| | | |
|---|---|---|
| EP | 1 002588 A1 | 2/1997 |
| GB | 1526663 | 4/1977 |
| GB | 1578948 | 10/1977 |
| GB | 2176424 A | 6/1986 |
| GB | 2176425 A | 6/1986 |
| GB | 2206501 A | 7/1987 |
| WO | WO 94/23849 | 4/1994 |
| WO | WO 96/33792 | 4/1996 |
| WO | WO 01 97947 A | 12/2001 |

OTHER PUBLICATIONS

Brandt EPI Composite Catalog, pp 1–12, 1996.
"Brandt King Cobra shakers; economical design, rugged performance," Brandt, A Varco Company, 2002, 2 pp.
Re: U.S. Appl. No. 09/837,131, filed Apr. 18, 2001.
PCT/GB03/03838, Int'l Search Report, Nov. 28, 2003.
Int'l Preliminary Examination Report. PCT/GB03/03838: Aug. 13, 2004: 4 pp.

*Primary Examiner*—Donald P. Walsh
*Assistant Examiner*—Joseph C Rodriguez
(74) *Attorney, Agent, or Firm*—Guy McClung (57) ABSTRACT

A support apparatus for supporting at least one screen assembly of a vibratory separator, the vibratory separator having seal apparatus for sealing an interface between a portion of the at least one screen assembly and an interior surface of the support apparatus, the seal apparatus including a seal member removably held by a seal holder within the vibratory separator, the support apparatus including container apparatus having a side wall, the side wall having an opening therethrough adjacent an end of the seal apparatus, and a cover removably connected to the side wall on an exterior surface thereof, the cover removable to provide access to the seal apparatus.

27 Claims, 4 Drawing Sheets

U.S. PATENT DOCUMENTS

| | | |
|---|---|---|
| 6,513,664 B1 | 2/2003 | Logan et al. |
| 6,513,665 B1 | 2/2003 | Hukki et al. |
| 6,543,621 B2 * | 4/2003 | Baltzer et al. .............. 209/405 |
| 6,575,304 B2 | 6/2003 | Cudahy |
| 6,581,781 B1 | 6/2003 | Adams et al. |
| 2002/0056667 A1 | 5/2002 | Beltzer et al. |
| 2002/0153289 A1 | 10/2002 | Suter et al. |

* cited by examiner

REMOVABLE SEAL APPARATUS FOR VIBRATORY SEPARATOR

BACKGROUND OF THE INVENTION

1. Field of the Invention

The present invention is directed to vibratory separators and shale shakers; to apparatus for accessing seals for screen assemblies in such separators and shakers; and to methods of their use.

2. Description of Related Art

The prior art discloses a variety of separators and shakers in which one or more screen assemblies are mounted in a basket or other screen assembly supporting or mounting structure. Often it is desirable to seal an interface between an end or side of a screen assembly and the basket (or other screen supporting or mounting structure). In many prior art apparatuses these seals are accessed by removing the screen assemblies. This can be a relatively long and expensive procedure and can require unnecessary handling of a screen assembly that can result in damage to an otherwise acceptable screen assembly which has some useful life remaining. Such a procedure also requires that the apparatus be shut down while the screen assemblies are removed. The seal is changed, and the screen assemblies reinstalled.

There has long been a need, recognized by the present inventor, for a system that provides easy access to a screen assembly seal. There has long been a need, recognized by the present inventors, for a method to inspect or change such a seal in a relatively short time.

SUMMARY OF THE PRESENT INVENTION

The present invention, in at least certain aspects, provides a vibratory separator with a screen assembly mounting structure, support or basket which has side walls adjacent one or more screen assemblies mounted therein or thereon. At least one end or side of a screen assembly abuts an interior surface of a side wall or of an end of the basket etc. Seal holding structure removably holds seal member apparatus. An access opening is provided in the wall or end of the basket etc. A movable (e.g. bolted, hinged, removable or openable) door (or cover) selectively closes off the access opening. By opening the door, removing the door, or moving the door access is provided to the seal and to the seal holding structure permitting the seal to be removed and inspected and, if needed, replaced.

For multi-tiered separators and shakers with screen assemblies at different levels, multiple access openings are provided for accessing multiple seals.

The present invention, in at least certain aspects, provides new seals according to the present invention which are removably installable in new seal holders according to the present invention. In certain aspects a seal according to the present invention has a body with one or more indentations or recesses each corresponding to a holding portion of a seal holder. Part of the seal member projecting beyond the holding portions of he holder abut an end of screen assembly. In certain aspects this part of the seal member is flexible to enhance the sealing effect.

It is, therefore, an object of at least certain preferred embodiments of the present invention to provide:

New, useful, unique, efficient, non-obvious vibratory separators, shale shakers, screen assembly seals, holders for them, and methods for accessing screen assembly seals;

Such separators and shakers with seal access systems which permit the efficient inspection of seals and, if needed, replacement;

Such separators and shakers in which screen assemblies need not be removed and then reinstalled to inspect and/or replace such seals; and New, useful, unique, efficient, non-obvious seals for sealing a screen/mounting structure interface.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of certain embodiments of the invention may be had by references to the embodiments which are shown in the drawings which form a part of this specification.

FIG. 4B is an end view (of both ends), FIG. 4C a top view, FIG. 4D a bottom view, FIG. 4E a front view, and FIG. 4F an rear view of the seal of FIG. 4A.

DESCRIPTION OF EMBODIMENTS PREFERRED AT THE TIME OF FILING FOR THIS PATENT

Figure 1:
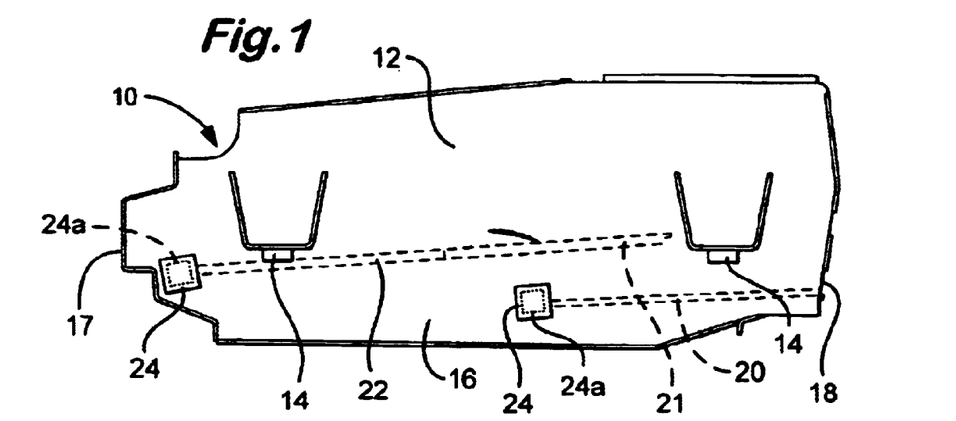
FIG. 1 is a side view of a basket for a vibratory separator or shale shaker according to the present invention.
Figure 2:
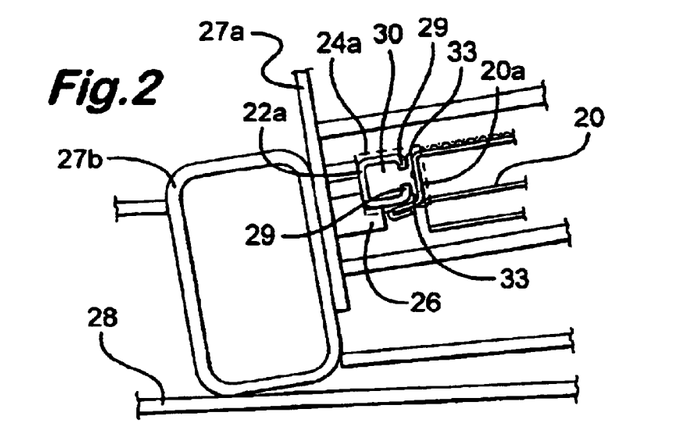
FIG. 2 is an enlargement of seal holding structure of the separator or shaker of FIG. 1.
Figure 3:
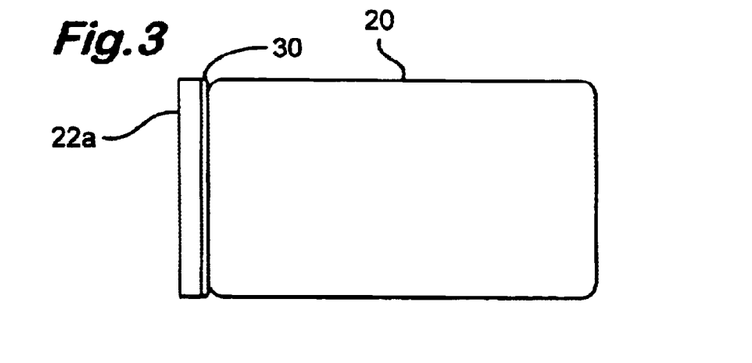
FIG. 3 is a top view of a screen assembly in the separator or shaker of FIG. 1.

FIGS. 1–3 show a vibratory separator or shale shaker 10 (henceforth referred to as shaker 10) which has a basket 12 for holding a plurality of screen assemblies 20, 21, and 22. The basket 12 has spring mounts 14 and side walls 16 (one shown) with ends 17 and 18 interconnecting the two spaced-apart side walls. The screen assemblies 20 and 21 each have an ends 20*a* and 21*a*, respectively, which abuts a seal member mounted within the basket 12. As shown in detail in FIG. 2 the end 20*a* of the screen assembly 20 sealingly contacts a seal member 30 according to the present invention which is removably held within a seal holder 22 according to the present invention.

Adjacent each seal holder is a removable cover 24 which is secured (e.g. with bolts, not shown) over corresponding openings 24*a* through the side wall 16 of the basket 12. A dotted line 24*b* indicates the location of this opening in FIG. 2. Upon removal of the cover 24, the seal member 30 can be grasped and removed from the seal holder 22. If necessary, a new seal member 30 can be installed in the seal holder 30 and the cover 24 replaced. It is within the scope of this invention to use doors hingedly connected over the openings 24. Seals or gasket may be used on the covers or doors to seal their interface with the basket wall. Alternatively the cover 24 is movably secured over the opening 24b (e.g. with a bolt or rod on which it can rotate) and is moved aside to access a seal member.

The seal holder 22 is secured to a support 26 which is connected to a structural member 27a within the shaker 10. The structural member 27a is itself connected to another structural member 27b which rests on a base 28 of the shaker 10.

Figures 4, 4A, 4I:
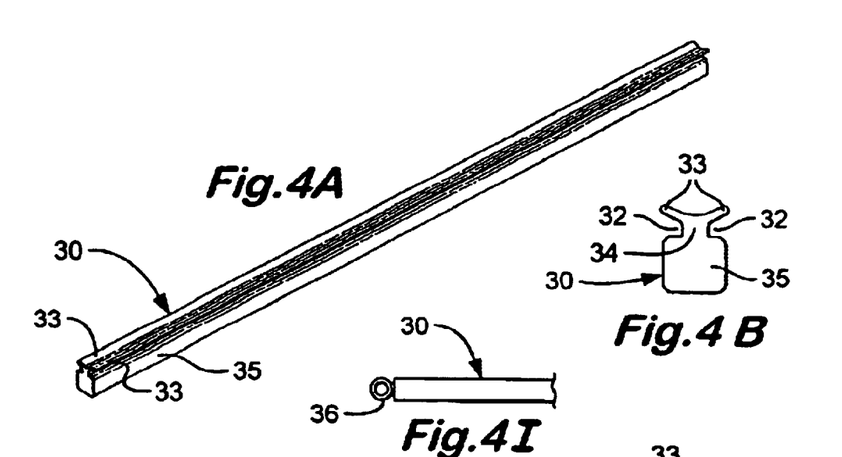
FIG. 4A is a perspective view of a seal according to the present invention which is shown in cross-section in FIG. 2.
FIG. 4I is a bottom view of a seal according to the present invention.
Figure 4C:
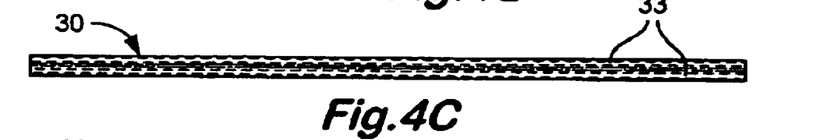
Figure 4D:
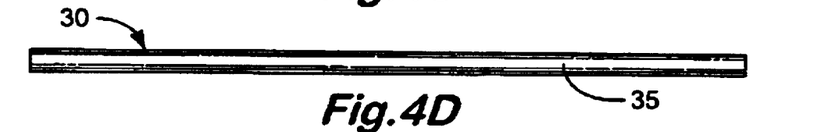
Figure 4E:
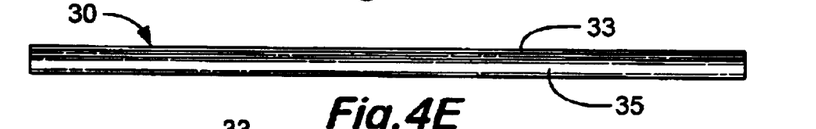
Figure 4F:
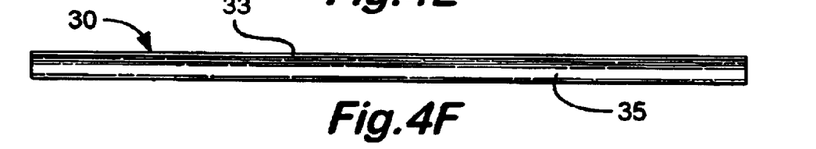
Figure 4G:
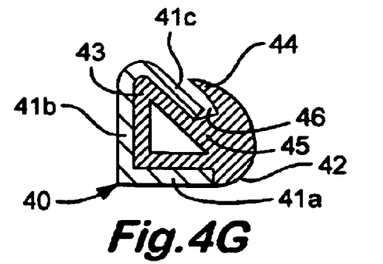
FIGS. 4G and 4H are side cross-section views of seals according to the present invention in seal holders according to the present invention.

The seal member 30 as shown in FIGS. 4A–4F has at least one recess 32 (two shown in FIG. 4A) into which projects a projecting part 29 of the seal holder 22. The seal holder 22 has at least one (two shown in FIG. 2) projecting part 29. The seal member 30 has a body 35 from which projects a part 34. Two lips or arms 33 project from the part 34. Initially an obtuse angle is defined between the lips 33. The lips 33 are flexible so that upon contacting an end of a screen assembly they are movable resulting in an increased amount of the surface of the lips 33 contacting the end of the screen assembly, e.g. to move to a position as shown in FIG. 2. This flexibility enhances the sealing contact of the lips 33 against the end of the screen assembly. The seal member 30 (as is the case for any seal or seal member of FIGS. 5–9 and any disclosed herein) may be made of any suitable known seal material, including, but not limited to neoprene, nitrile rubber, plastic, fiberglass, metal, wood, or composite material. In one particular aspect the seal member 30 as shown in FIG. 4A is made of urethane, is about 1 inch in height, about ⅝ inches in width, about 29.5 inches long and has a hardness of 95 durometer. In certain aspects such a seal has a hardness of 70 durometer. Such a seal member is suitable for use in a shale shaker which is used to treat drilling fluid material from an earth wellbore. In one aspect, the lips 33 are deleted. As shown, the recesses 32 extend along the entire length of the seal member 30. This permits the seal member 30 to be installed from the side in a seal holder. In one aspect, e.g. as shown in FIG. 2, the body 35 of the seal member 30 fills substantially all of he interior space of the seal holder 22 (as may be the case with any seal according to the present invention). As shown in FIG. 4I the seal member 30 may, optionally, (as may any seal or seal member according to the present invention) have a pulling apparatus 36 on one or both ends to facilitate removal from a seal holder. Although the pulling apparatus 36 is shown as a ring with an open center, the open center may be deleted or any suitable structure such as, but not limited to a tab or cylinder, may be used to facilitate movement of a seal or seal member. 24. FIG. 4G shows a seal holder 40 according to the present invention which has a lower part 41a, an upright part 41b, and a top part 41c projecting downwardly. A seal 42 has a body 43 releasably and removably disposed in an interior space of the seal holder 40. Optionally, the body 43 is hollow as shown (or it may be solid). A lip 44 is connected to or formed integrally of a projecting part 45. The projecting part 46 is connected to or formed integrally of the body 43. The seal holder 40 can be used in a vibratory separator or shale shaker as the seal holder 22, FIG. 2, is used. Preferably the shape of the interior space of the seal holder 40 and of the body 43 of the seal 42 are substantially the same. The lip 44 is optional. Preferably the seal 42 is flexible to enhance its sealing effect against the end of a screen assembly. The top part 41c of the seal holder 40 projects into a recess 46 formed between the lip 44 and the body 43 of the seal 42. This assists in maintaining the seal 42 in a desired position with respect to the end of a screen assembly.

Figure 4H:
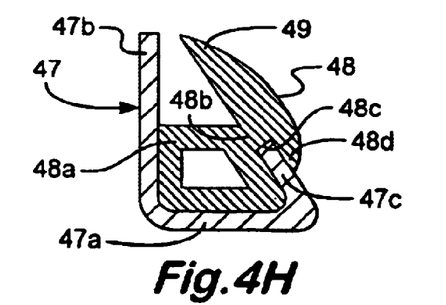

FIG. 4H shows a seal holder 47 according to the present invention which has a lower part 47a, an upright part 47b, and an inclined part 47c projecting upwardly. A seal 48 has a body 48a releasably and removably disposed in an interior area of the seal holder 47. Optionally, the body 48a is hollow as shown (or it may be solid). A lip 49 is connected to or formed integrally of a projecting part 48b. The projecting part 48b is connected to or formed integrally of the body 48a. The seal holder 47 can be used in a vibratory separator or shale shaker as the seal holder 22, FIG. 2, is used. Preferably the shape of the interior space of the seal holder 47 and of the major portion of the body 48a of the seal 47 are substantially the same. The lip 49 is optional. Preferably the seal 82 is flexible to enhance its sealing effect against the end of a screen assembly. The inclined part 47c of the seal holder 47 projects into a recess 48c formed between a lower part 48d of the lip 49 and the body 48a of the seal 48. This assists in maintaining the seal 48 in a desired position with respect to the end of a screen assembly. In one aspect the lip 49 is flexible with respect to the projecting part 48b and can move backwardly (to the left in FIG. 4H) to accommodate a screen assembly end and/or to enhance sealing contact therewith.

The screen assembly 20 as shown has a tongue-end 21, a frame 23, and screening material 25. It is within the scope of this invention for the screen assembly 20 (as is the case for the screen assemblies in FIGS. 5–9 and any screen assembly disclosed herein) to be any known screen assembly that abuts an end, side, or surface of a vibratory separator or shaker; and for the screening material to be any known screening material of one or more layers, with or without support, with or without layers connected together, which are generally flat or undulating.

Figure 5:
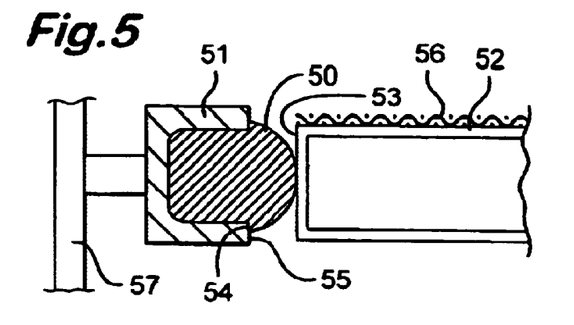
FIGS. 5–8 are side cross-section views of seal structure according to the present invention.

FIG. 5 shows a seal 50 removably mounted in a seal holder 51 with a screen assembly 52 (shown schematically) having an end 53 sealingly contacting the seal 50. The seal 50 has a lip 54 that abuts an exterior surface 55 of the seal holder 51. The seal holder 51 is positioned, e.g., as is the seal holder 22, FIG. 2. The screen assembly 52 has screening material 56. The seal 50 is of a length substantially equal to or slightly larger than a length of the end 53. The seal holder 51 is secured to, connected to, or formed integrally of a side wall 57 of a basket or other screen supporting structure of a separator or shaker.

Figure 6:
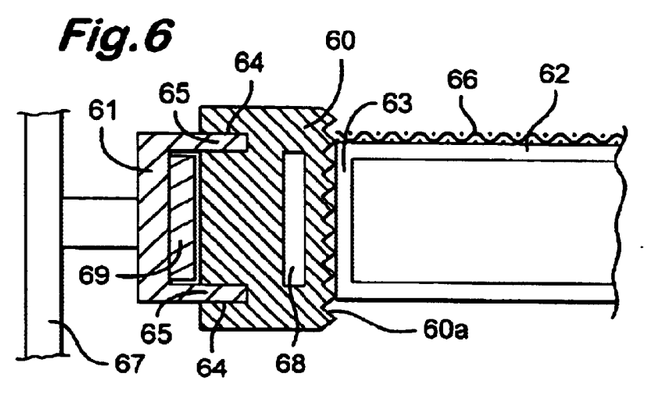

FIG. 6 shows a seal 60 removably mounted to a seal holder 61 with a screen assembly 62 (shown schematically) having an end 63 sealingly contacting the seal 60. The seal 60 has a recesses 64 that receive portions 65 of the seal holder 61. The seal holder 61 is positioned, e.g., as is the seal holder 22, FIG. 2. The screen assembly 62 has screening material 66. The seal 60 is of a length substantially equal to or slightly larger than a length of the end The seal holder 61 is secured to, connected to, or formed integrally of a side wall 67 of a basket or other screen supporting structure of a separator or shaker. Optionally, the seal 60 has a void space 68 which enhances seal/screen assembly contact and, also optionally, a corrugated surface 60a for contacting the screen end Optionally a member 69 may be permanently or removably positioned within the seal holder 61 to serve as a space maintainer, shock absorber, cushion, and/or seal and may be made of any suitable plastic, metal, composite, fiberglass, alloy or seal material.

Figure 7:
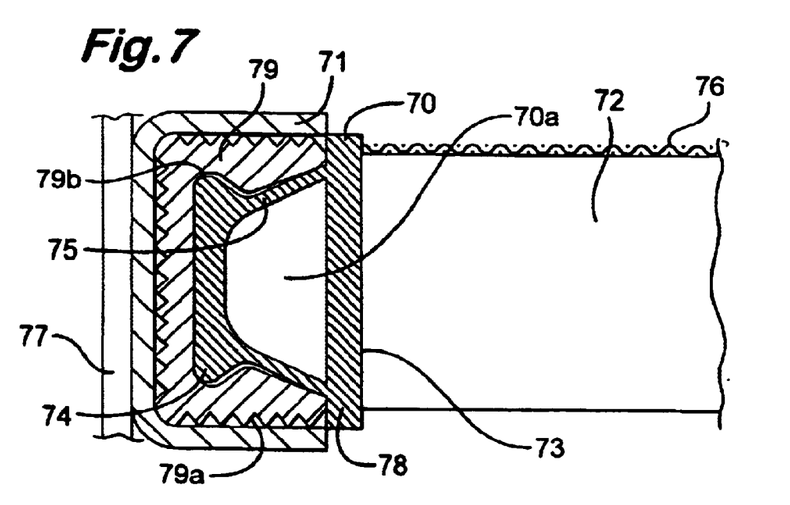

FIG. 7 shows a seal 70 removably mounted in a seal holder 71 with a screen assembly 72 (shown schematically) having an end 73 sealingly contacting the seal 70. The seal 70 has a lip 74 that abuts a surface 75 of a seal holder 79. The seal holder 79 is removably or permanently positioned within a seal holder 71 which is positioned, e.g., as is the seal holder 22, FIG. 2. The screen assembly 72 has screening material 76. The seal 70 is of a length substantially equal to or slightly larger than a length of the end 73. The seal holder 71 is secured to, connected to, or formed integrally of a side wall 77 of a basket or other screen supporting structure of a separator or shaker. The seal holder 79 may be made of any material mentioned above for the member 69. Optionally the seal holder 79 may have a corrugated outer surface 79a to facilitate its movement within the seal holder 71. A recess 79b receives a lip 74 of the seal 70. A wall 75 connects the lip 74 to an outer part 78 of the seal 70. Optionally, the seal 70 has an inner void space 70a.

Figure 8:
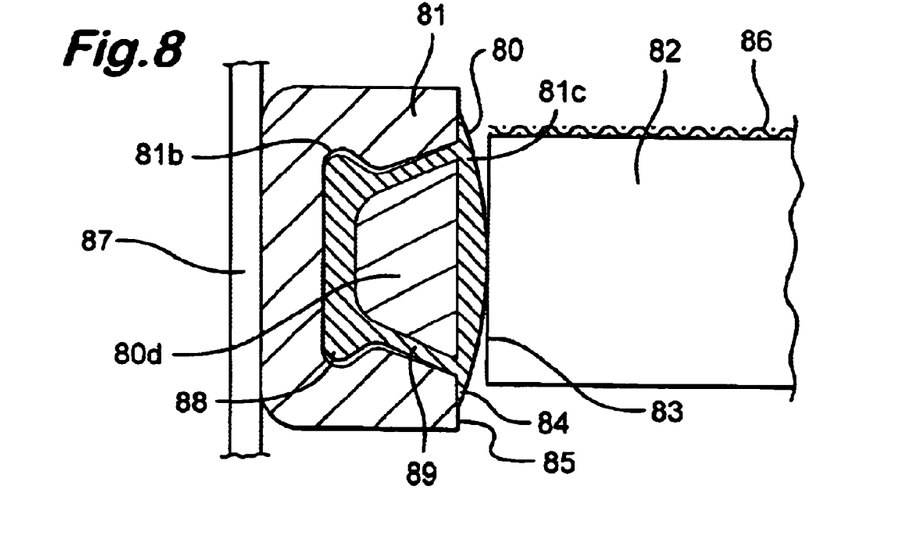

FIG. 8 shows a seal 80 removably mounted in a seal holder 81 with a screen assembly 82 (shown schematically) having an end 83 sealingly contacting the seal 80. The seal 80 has a lip 84 that abuts an exterior surface 85 of the seal holder 81. The seal holder 81 is positioned, e.g., as is the seal holder 22, FIG. 2. The screen assembly 82 has screening material 86. The seal 80 is of a length substantially equal to or slightly larger than a length of the end 83. The seal holder 81 is secured to, connected to, or formed integrally of a side wall 87 of a basket or other screen supporting structure of a separator or shaker. A recess 81b receives a lip 88 of the seal 80. A wall 89 connects the lip 81b to an outer part 81c of the seal 80. A rigid member 80d extends throughout the length of the seal 80 to provide strength and rigidity. Any seal or seal member according to the present invention may have a rigid member like the rigid member 80d of a cross-sectional shape similar to or different than that of the rigid member 80d (e.g., oval, circular, square).

The seal holders of FIGS. 5–8 have a length corresponding to the length of the seals mounted therein or thereto (e.g. slightly shorter, slightly larger or similar to that of the seal holder 22)

Figure 9:
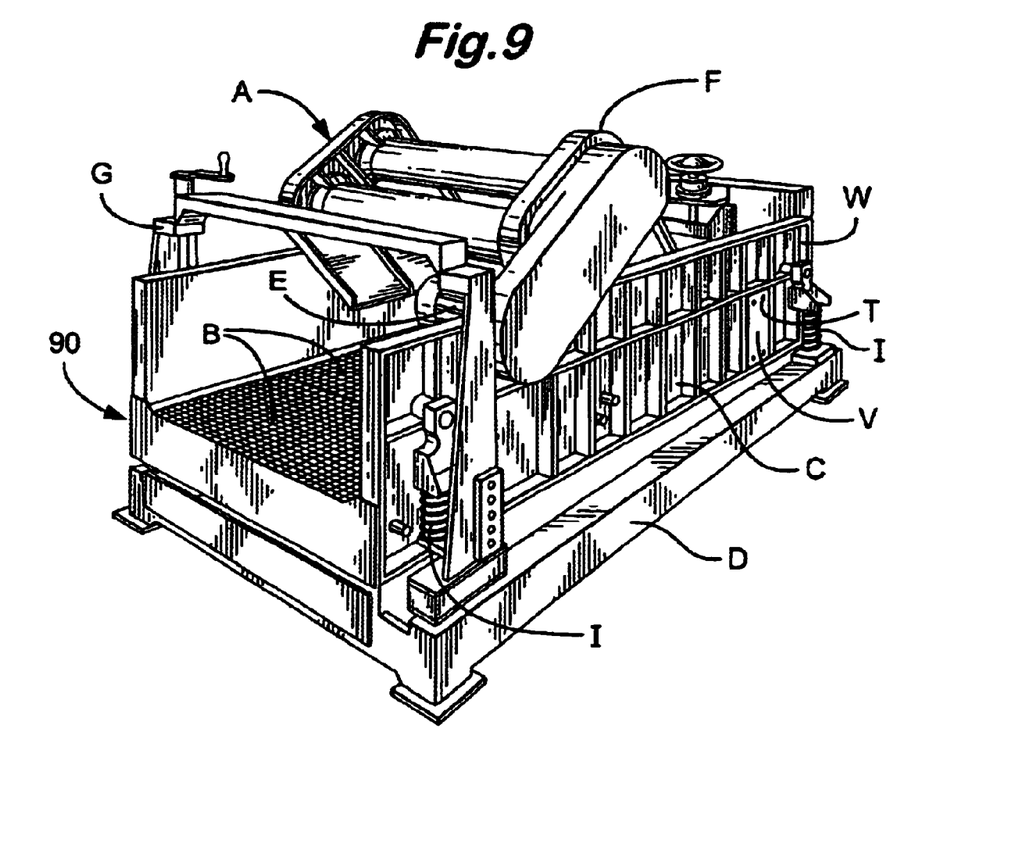
FIG. 9 is a perspective view of a shale shaker according to the present invention.

FIG. 9 shows a shale shaker 100 according to the present invention with screens B (with screen or screening cloth or mesh as desired) mounted on the vibratable screen mounting apparatus or basket C. The screens B may be any screen disclosed or referred to herein or have any combination of any feature or features of any screen or screen part disclosed herein. The basket C is mounted on springs I (only two shown; two as shown are on the opposite side) which are supported from a frame D. The basket C is vibrated by a motor E and interconnected vibrating apparatus F which is mounted on the basket C for vibrating the basket and the screens. Elevator apparatus G provides for raising and lowering of the basket end.

An access cover V is removably secured with bolts T over an opening through a wall W of the basket C for providing access to seal structure (not shown, like any discussed above) which seals a screen/basket interface within the basket C.

The present invention, therefore, provides, in at least certain embodiments, a support apparatus for supporting at least one screen assembly of a vibratory separator, the vibratory separator having seal apparatus for sealing an interface between a portion of the at least one screen assembly and an interior surface of the support apparatus, the seal apparatus including a seal member removably held by a seal holder within the vibratory separator, the support apparatus having container apparatus (e.g., but not limited to, a basket of a shale shaker) having a side wall, the side wall having an opening therethrough adjacent an end of the seal apparatus, and a cover movably connected to the side wall on an exterior surface thereof, the cover movable to provide access to the seal apparatus. Such a support may have one or some, in any possible combination, fo the following: wherein the at least one screen assembly is two screen assemblies, the vibratory separator apparatus has individual seal apparatus corresponding to each screen assembly, the side wall has an access opening corresponding to each individual seal apparatus, and the side wall has a movable cover over each access opening; a seal holder within the support apparatus for releasably holding the seal member; wherein the seal holder is generally C shaped in cross-section; the seal member, and the seal member has a length and the seal holder has a length at least equal to the length of the seal member; and/or the seal member, the seal member having at least one recess and the seal holder having a projecting part for projecting into the or each of the recesses of the seal member or the seal member having opposed recesses and the seal holder having opposed in-turned edges for projecting into the recesses of the seal member.

The present invention, therefore, provides, in at least certain embodiments, a holder for holding a seal member for sealing an interface with a screen assembly mounted in a vibratory separator, the holder having a solid body (or a body with a hollow interior) for releasably holding part of a seal member, the seal member having at least one recess, the body having at least one projecting part projecting from the body member, the projecting part sized, configured, and positioned for releasable receipt within the at least one recess of the seal member. Such a holder may have a plurality of recesses and the at least one projecting part is a plurality of projecting parts, one projecting part corresponding to each recess.

The present invention, therefore, provides, in at least certain embodiments, a seal (seal structure or seal member) for sealing an interface between a screen assembly and a vibratory separator in which the screen assembly is mounted, the seal having a body, at least one recess in the body, and the at least one recess sized, configured and positioned for releasable receipt therein of part of a seal holder of the vibratory separator. Such a seal may have one or some, in any possbile combination, of the following: a projecting portion of the seal projecting from the body and adjacent the at least one recess, the projecting portion for sealingly contacting the screen assembly; and/or wherein the projecting portion includes a main arm projecting from the body, and one lip or two spaced-apart lips projecting from the main arm; wherein the two spaced-apart lips are at a right anle or at an obtuse angle to each other.

The present invention, therefore, provides, in at least certain embodiments, a seal for sealing an interface between a screen assembly and a vibratory separator in which the screen assembly is mounted, the seal having a body, the body having a first end and a second end, the second end spaced-apart from the first end, and a pull apparatus (e.g., but not limited to, a tab, a ring, a projection at a seal end located for pulling) connected to the first end.

The present invention, therefore, provides, in at least certain embodiments, a vibratory separator having a basket (or box or container) for supporting screen assembly apparatus, the basket having a first side wall spaced-apart from a second side wall by two opposed ends, the basket having an interior surface, vibrator apparatus connected to the basket to vibrate the basket and the screen assembly apparatus, screen assembly apparatus releasably secured to the basket, the screen assembly apparatus having an interface portion interfacing with a corresponding part of the interior surface of the basket, seal apparatus connected to the basket for sealing an interface between the interface portion of the screen assembly apparatus and the corresponding part of the interior surface of the basket, the seal apparatus including a seal holder and a seal member releasably held by the seal holder, an access opening through the first side wall adjacent part of the seal apparatus and through which the seal member is accessible and passable, and a cover on an exterior of the first side wall movable with respect to the side wall to provide selective access to the seal apparatus through the access opening. Such a vibratory separator may have one or some, in any possible combination, fo the following: wherein the vibratory separator is a shale shaker for treating drilling fluid material from an earth wellbore and the seal member is made of material able to withstand the drilling fluid material; wherein the screen assembly apparatus has at least a first assembly and a second screen assembly, the first screen assembly with at least a portion thereof disposed at a level higher than at least a portion of a level of the second screen assembly, each of the first screen assembly and the second screen assembly having an end portion interfacing a corresponding surface of part of the basket, the seal apparatus including first seal apparatus for the first screen assembly and second seal apparatus for the second screen assembly, each seal apparatus having a seal holder and a seal member, an access opening through the side wall corresponding in position to each seal apparatus, and a cover movably connected over each access opening; wherein the seal holder is generally C-shaped in cross-section; wherein the seal holder has at least one part for projecting into a corresponding recess of the seal member, and the seal member has at least one recess corresponding to each of the at least one part of the seal holder; wherein the seal holder has an outer surface, and the seal member has a portion for sealingly contacting the outer surface; wherein the seal member has a void inner space; wherein the seal member has an inner rigid member; a spacer member within the seal holder between an inner surface of the seal holder and an outer surface of the seal member; wherein the spacer member is made of cushion material; wherein the seal holder has a body with a hollow interior for releasably holding part of the seal member, the seal member having at least one recess, the body having at least one projecting part projecting from the body member, the projecting part sized, configured, and positioned for releasable receipt within the at least one recess of the seal memberand/or wherein the seal member has a body, at least one recess in the body, and the at least one recess sized, configured and positioned for releasable receipt therein of part of a seal holder of the vibratory separator.

The present invention, therefore, provides, in at least certain embodiments, a container (e.g. a basket, box, etc.) for a vibratory separator, the container for containing and supporting screen assembly apparatus used with the vibratory separator, the container having spaced-apart walls connected by interconnecting members, the spaced-apart walls having space therebetween for encompassing screen assembly apparatus, the spaced-apart walls including a first wall and a second wall, seal apparatus connected to the first wall of the spaced-apart walls for sealing an interface between the screen assembly apparatus and the first wall, an access opening through the second wall adjacent part of the seal apparatus, and a cover over the access opening, the cover movable with respect to the second wall to provide selective access to the seal apparatus through the access opening.

The present invention, therefore, provides, in at least certain embodiments, methods for treating material with a vibratory separator, the vibratory separator as any disclosed herein according to the present invention, the methods including activating the vibratory separator, introducing material to be treated (e.g., but not limited to, drilling fluid from a wellbore with solids entrained therein) to the vibratory separator, and screening the material so that part thereof passes through the screen assembly apparatus. Such methods may have one or some, in any possbile ocmbination, of the following wherein the seal member is accessed without removing the screen assembly apparatus from the vibratory separator; and/or deactivating the vibratory separator, and moving the cover to access the seal member.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112. The inventor may rely on the Doctrine of Equivalents to determine and assess the scope of their invention and of the claims that follow as they may pertain to apparatus not materially departing from, but outside of, the literal scope of the invention as set forth in the following claims. Any patent or patent application referred to herein is incorporated fully herein for all purposes.

What is claimed is:

1. A vibratory separator comprising
  a basket for supporting screen assembly apparatus, the basket having a first side wall spaced-apart from a second side wall by two opposed ends, the basket having an interior surface,
  a vibrator apparatus connected to the basket to vibrate the basket and the screen assembly apparatus,
  a screen assembly apparatus releasably secured to the basket, the screen assembly apparatus having an interface portion interfacing with a corresponding part of the interior surface of the basket,
  a seal apparatus connected to the basket for sealing an interface between the interface portion of the screen assembly apparatus and the corresponding part of the interior surface of the basket,
  the seal apparatus including a seal holder and a seal member releasably held by the seal holder,
  an access opening through the first side wail adjacent part of the seal apparatus and through which the seal member is passable, and
  a cover on an exterior of the first side wall movable with respect to the side wall to provide selective access to the seal apparatus through the access opening,
  wherein the seal holder has at least one part for projecting into a corresponding recess of the seal member, and the seal member has at least one recess corresponding to each of the at least one part of the seal holder.

2. The vibratory separator of claim 1 wherein the vibratory separator is a shale shaker for treating drilling fluid material from an earth wellbore and the seal member is made of material able to withstand the drilling fluid material.

3. The vibratory separator of claim 1
wherein the screen assembly apparatus comprises at least a first assembly and a second screen assembly, the first screen assembly with at least a portion thereof disposed at a level higher than at least a portion of a level of the second screen assembly,
each of the first screen assembly and the second screen assembly having an end portion interfacing a corresponding surface of part of the basket,
the seal apparatus comprising first seal apparatus for the first screen assembly and second seal apparatus for the second screen assembly, each seal apparatus comprising a seal holder and a seal member,
an access opening through the side wall corresponding to each seat apparatus, and
a cover movably connected over each access opening.

4. The vibratory separator of claim 1 wherein the seal holder is generally C-shaped in cross-section.

5. The vibratory separator of claim 1
wherein the seal holder has an outer surface, and
wherein the seal member has a portion for sealingly contacting said outer surface.

6. The vibratory separator of claim 1 wherein the seal member has a void inner space.

7. The vibratory separator of claim 1 wherein the seal member has an inner rigid member.

8. The vibratory separator of claim 1 further comprising a spacer member within the seal holder between an inner surface of the seal holder and an outer surface of the seal member.

9. The vibratory separator of claim 8 wherein the spacer member is made of cushion material.

10. A vibratory separator comprising
a basket for supporting screen assembly apparatus, the basket having a first aide wall spaced-apart from a second side wall by two opposed ends, the basket having an interior surface,
a vibrator apparatus connected to the basket to vibrate the basket end the screen assembly apparatus,
a screen assembly apparatus releasably secured to the basket, the screen assembly apparatus having an interface portion interfacing with a corresponding part of the interior surface of the basket,
a seal apparatus connected to the basket for sealing an interface between the interface portion of the screen assembly apparatus and the corresponding part of the interior surface of the basket,
the seal apparatus including a seal holder and a seal member releasably held by the seal holder,
an access opening through the first side wall adjacent part of the seal apparatus and through which the seal member is passable, and
a cover on an exterior of the first side wall movable with respect to the side well to provide selective access to the seal apparatus through the access opening
wherein the seal holder has at least one part for projecting into a corresponding recess of the seal member,
the seal member has at least one recess corresponding to each of the at least one part of the seal holder,
wherein the seal holder comprises
a body with a hollow interior for releasably holding part of the seal member, the seal member having at least one recess thereon, and
the body having at least one projecting part projecting from the body member, the projecting part sized, configured, and positioned for releasable receipt within the at least one recess of the seal member.

11. The vibratory separator of claim 10 wherein the vibratory separator is a shale shaker for treating drilling fluid material from an earth wellbore and the seal member is made of material able to withstand the drilling fluid material.

12. The vibratory separator of claim 10
wherein the screen assembly apparatus comprises at least a first assembly and a second screen assembly, the first screen assembly with at least a portion thereof disposed at a level higher than at least a portion of a level of the second screen assembly,
each of the first screen assembly and the second screen assembly having an end portion interfacing a corresponding surface of part of the basket,
the seal apparatus comprising first seal apparatus for the first screen assembly and second seal apparatus for the second screen assembly, each semi apparatus comprising a seal holder and a seal member,
an access opening through the side wail corresponding to each seal apparatus, and
a cover movably connected over each access opening.

13. The vibratory separator of claim 10 wherein the seal holder is generally C-shaped in cross-section.

14. The vibratory separator of claim 10
wherein the seal holder has an outer surface, and
wherein the seal member has a portion for sealingly contacting said outer surface.

15. The vibratory separator of claim 10 wherein the seal member has a void inner space.

16. The vibratory separator of claim 10 wherein the seal member has an inner rigid member.

17. The vibratory separator of claim 10 further comprising
a spacer member within the seal holder between an inner surface of the seal holder and an outer surface of the seal member.

18. The vibratory separator of claim 10 wherein the spacer member is made of cushion material.

19. A vibratory separator comprising
a basket for supporting screen assembly apparatus, the basket having a first side wall spaced-apart from a second side wail by two opposed ends, the basket having an interior surface,
a vibrator apparatus connected to the basket to vibrate the basket and the screen assembly apparatus,
a screen assembly apparatus releasably secured to the basket, the screen assembly apparatus having an interface portion interfacing with a corresponding part of the interior surface of the basket,
a seal apparatus connected to the basket for sealing an interface between the interface portion of the screen assembly apparatus and the corresponding part of the interior surface of the basket,
the seal apparatus including a seal holder and a seal member releasably held by the semi holder,
an access opening through the first side wall adjacent part of the seal apparatus and through which the seal member is passable, and a cover on an exterior of the first side wall movable with respect to the side wall to provide selective access to the seal apparatus through the access opening wherein the seal holder has at least one part for projecting into a corresponding recess of the seal member, the seal member has at least one recess corresponding to each of the at least one part of the seal holder, wherein the seal member comprises a body, at least one recess in the body, and the at least one recess sized, configured and positioned for releasable receipt therein of part of a seal holder of the vibratory separator.

20. The vibratory separator of claim 19 wherein the vibratory separator is a shale shaker for treating drilling fluid material from an earth wellbore and the seal member is made of material able to withstand the drilling fluid material.

21. The vibratory separator of claim 19 wherein the screen assembly apparatus comprises at least a first assembly and a second screen assembly, the first screen assembly with at least a portion thereof disposed at a level higher than at least a portion of a level of the second screen assembly, each of the first screen assembly and the second screen assembly having an and portion interfacing a corresponding surface of part of the basket, the seal apparatus comprising first seal apparatus for the first screen assembly and second seal apparatus for the second screen assembly, each seal apparatus comprising a seal holder and a seal member, an access opening through the side wall corresponding to each seal apparatus, and a cover movably connected over each access opening.

22. The vibratory separator of claim 19 wherein the seal holder is generally C-shaped in cross-section.

23. The vibratory separator of claim 19 wherein the seal holder has an outer surface, and wherein the seal member has a portion for sealingly contacting said outer surface.

24. The vibratory separator of claim 19 wherein the seal member has a void inner space.

25. The vibratory separator of claim 19 wherein the seal member has an inner rigid member.

26. The vibratory separator of claim 19 further comprising a spacer member within the seal holder between en inner surface of the seal holder end an outer surface of the seal member.

27. The vibratory separator of claim 19 wherein the spacer member is made of cushion material.

* * * * *